(12) United States Patent
Zhao et al.

(10) Patent No.: US 9,380,351 B2
(45) Date of Patent: Jun. 28, 2016

(54) APPARATUS FOR TRANSMITTING ENCODED VIDEO STREAM AND METHOD FOR TRANSMITTING THE SAME

(71) Applicant: LG DISPLAY CO., LTD., Seoul (KR)

(72) Inventors: Jing Zhao, San Diego, CA (US); Ben Lee, Corvallis, OR (US); Tae Wook Lee, Paju-si (KR); Chang Gone Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 9 days.

(21) Appl. No.: 14/158,293

(22) Filed: Jan. 17, 2014

(65) Prior Publication Data

US 2015/0207834 A1    Jul. 23, 2015

(51) Int. Cl.
  *H04N 21/63*   (2011.01)
  *H04L 29/06*   (2006.01)
  *H04N 21/2362* (2011.01)
  *H04N 21/643*  (2011.01)
  *H04N 21/845*  (2011.01)

(52) U.S. Cl.
  CPC .......... *H04N 21/631* (2013.01); *H04L 65/4069* (2013.01); *H04L 65/607* (2013.01); *H04L 69/165* (2013.01); *H04N 21/2362* (2013.01); *H04N 21/64322* (2013.01); *H04N 21/8456* (2013.01); *H04L 65/608* (2013.01); *H04L 65/80* (2013.01); *H04L 69/161* (2013.01)

(58) Field of Classification Search
  CPC ..... H04L 65/60; H04L 65/602; H04L 65/607; H04L 69/14; H04L 69/165; H04N 21/234327; H04N 21/60; H04N 21/631

USPC ................ 709/730, 731; 375/240.12, 240.13
See application file for complete search history.

(56) References Cited

U.S. PATENT DOCUMENTS

| | | | |
|---|---|---|---|
| 5,544,328 A * | 8/1996 | Seshadri | H04L 27/3488 375/254 |
| 6,490,705 B1 * | 12/2002 | Boyce | 375/E7.088 |
| 6,646,674 B1 * | 11/2003 | Kato | 348/14.13 |
| 6,771,594 B1 | 8/2004 | Upadrasta | |
| 6,850,519 B1 * | 2/2005 | Saito et al. | 370/389 |
| 7,145,919 B2 * | 12/2006 | Krishnarajah et al. | 370/474 |

(Continued)

OTHER PUBLICATIONS

Schierl et al., "Scalable Video Coding Over RTP and MPEG-2 Transport Stream in Broadcast and IPTV Channels," IEEE Wireless Communications, vol. 16, No. 5, Oct. 2009, pp. 64-71.*

(Continued)

*Primary Examiner* — Vivek Srivastava
*Assistant Examiner* — William C McBeth
(74) *Attorney, Agent, or Firm* — Birch, Stewart, Kolasch & Birch, LLP

(57) ABSTRACT

Discussed is an apparatus for transmitting encoded video stream that may include an encoder configured to encode a video stream using a predetermined compression standard; a parser configured to subdivide the encoded video stream into a plurality of sub-streams and parse the sub-streams; a MUX configured to segregate a first data which is NAL unit having SPS, PPS, or slice header and a second data which is NAL unit having slice data from the parsed sub-stream; a first packet generator configured to generate a TCP packet using the first data by the sub-stream and transmit the TCP packet through a TCP tunnel; and a second packet generator configured to generate a UDP packet using the second data by the sub-stream and transmit the UDP packet through a UDP tunnel.

18 Claims, 12 Drawing Sheets

(56) References Cited

U.S. PATENT DOCUMENTS

| | | | |
|---|---|---|---|
| 7,616,661 B2* | 11/2009 | Park et al. | 370/474 |
| 8,356,109 B2 | 1/2013 | Martinez et al. | |
| 8,606,952 B2* | 12/2013 | Pasetto | G06F 3/1431 709/231 |
| 2002/0164024 A1* | 11/2002 | Arakawa | H04L 29/06027 380/210 |
| 2004/0016000 A1* | 1/2004 | Zhang et al. | 725/143 |
| 2004/0057465 A1* | 3/2004 | Chen et al. | 370/474 |
| 2004/0083417 A1* | 4/2004 | Lane | H03M 13/356 714/758 |
| 2005/0190774 A1* | 9/2005 | Wiegand | 370/395.64 |
| 2007/0097205 A1* | 5/2007 | Venkatachalam | H04N 21/234327 348/14.02 |
| 2007/0223564 A1* | 9/2007 | Bruls | H04N 19/61 375/131 |
| 2010/0189182 A1* | 7/2010 | Hannuksela | 375/240.25 |
| 2010/0195977 A1* | 8/2010 | Bennett et al. | 386/84 |
| 2011/0090921 A1* | 4/2011 | Anthru et al. | 370/465 |
| 2012/0173748 A1 | 7/2012 | Bouazizi | |
| 2013/0003579 A1* | 1/2013 | Lu et al. | 370/252 |
| 2014/0059168 A1* | 2/2014 | Ponec et al. | 709/217 |

OTHER PUBLICATIONS

Wang et al., "Error Resilient Video Coding Using Unequally Protected Key Pictures," Lecture Notes in Computer Science, vol. 2849, 2003, pp. 290-297.*

Wenger, "H.264/AVC Over IP," IEEE Transactions on Circuits and Systems for Video Technology, vol. 13, No. 7, Jul. 2003, pp. 645-656.*

WO 2013/120074 A1, Aug. 2013, Rapaport et al.*

Pham et al., "Unequal Error Protection of H.264-AVC Video Bitstreams Based on Data Partioning and Motion Information of Slices," 2012 IEEE International Conference on Signal Processing, Communication and Computing, Aug. 2012, pp. 634-639.* van der Schaar et al., "Unequal Packet Loss Resilience for Fine-Granular-Scalability Video," IEEE Transactions on Multimedia, vol. 3, No. 4, Dec. 2001, pp. 381-394.*

Zhang et al., "A Hierarchical Unequal Packet Loss Protection Scheme for Robust H.264/AVC Transmission," Proceedings of the 6th IEEE Consumer Communications and Networking Conference, Jan. 2009, pp. 1-5.*

Zhang et al., "An Unequal Packet Loss Protection Scheme for H.264/AVC Video Transmission," Proceedings of the 23rd International Conference on Information Networking, Jan. 2009, pp. 1-5.*

Zhang et al., "Robust H.264-AVC Video Transmission using Data Partitioning and Unequal Loss Protection," 2010 IEEE 10th International Conference on Computer and Information Technology, Jun.-Jul. 2010, pp. 2471-2477.*

Ali et al., "Distortion-Based Slice Level Prioritization for Real-Time Video over QoS-Enabled Wireless Networks," Advances in Multimedia, vol. 2012, Jan. 2012.*

Park et al., "A Prioritized Multi-Queue Method for H.264/AVC Live Streaming in Wireless Networks," IEEE Ninth International Conference on Computer and Information Technology, vol. 2, Oct. 2009, pp. 331-336.*

Brosh et al., "The Delay-Friendliness of TCP," ACM SIGMETRICS Performance Evaluation Review, Jun. 2008, vol. 36, No. 1, pp. 49-60.

I.A. Richardson, "The H.264 Advanced Video Compression Standard," Second Edition, John Wiley & Sons, 2010, 349 pages.

IEEE Standard for Information Technology, "Telecommunications and Information Exchange Between Systems, Local and Metropolitan Area Networks" Specific Requirements, Part 11: Wireless Lan Medium Access Control (MAC) and Physical Layer (PHY) Specifications, IEEE Std. 802.11gTM, 2005, 77 pages.

Kim et al., "Distributed Video Streaming Using Multiple Description Coding and Unequal Error Protection," IEEE Transactions on Image Processing, Jul. 2005, vol. 14, No. 7, pp. 849-861.

Kim et al., "Receiver Buffer Requirement for Video Streaming over TCP," Proceedings of Visual Communications and Image Processing Conference, 2006, pp. 422-431.

Lee et al., "OEFMON: An Open Evaluation Framework for Multimedia Over Networks," IEEE Communications Magazine, Sep. 2011, vol. 49, No. 9, pp. 153-161.

Mok et al., "Measuring the Quality of Experience of HTTP Video Streaming," 2011 IFIP/IEEE International Symposium on Integrated Network Management, May 2011, pp. 485-492.

Nafaa et al., "Forward Error Correction Strategies for Media Streaming over Wireless Networks," IEEE Communications Magazine, Jan. 2008, vol. 46, No. 1, pp. 72-79.

Porter et al., "Hybrid TCP/UDP Video Transport for H.264/AVC Content Delivery in Burst Loss Networks," IEEE International Conference on Multimedia and Expo (ICME), Jul. 2011, 5 pages.

Shen et al., "Receiver Playout Buffer Requirement for TCP Video Streaming in the Presence of Burst Packet Drops," London Communications Symposium, vol. 2009, 2009, 4 pages.

Wang et al., "Error Control and Concealment for Video Communication: A Review," Proceedings of the IEEE, May 1998, vol. 86, No. 5, pp. 974-997.

Wang et al., "Multimedia Streaming via TCP: An Analytic Performance Study," ACM Transactions on Multimedia Computing, Communications and Applications, May 2008, vol. 4, No. 2, Chapter 16, pp. 1-16.

Wu et al., "Streaming Video Over the Internet: Approaches and Directions," IEEE Transactions on Circuits and Systems for Video Technology, Mar. 2001, vol. 11, No. 3, pp. 282-300.

Xu et al., "H.264 Video Communication Based Refined Error Concealment Schemes," Consumer Electronics, IEEE Transactions, vol. 50, No. 4, Nov. 2004, pp. 1135-1141.

Zhao et al., "Flexible Dual TCP/UDP Streaming for H.264 HD Video Over WLANS," Proceedings of the 7th International Conference on Ubiquitous Information Management and Communication, ICUIMC '13, New York, NY, USA, 2013, ACM, Chapter 34, pp. 1-9.

* cited by examiner (a) The original frame.

(b) The received frame.

(a) PSNR for Scenario 1.

(b) PSNR for Scenario 2.

(c) PSNR for Scenario 3.

(a) Packet loss for Scenario 1.

(b) Packet loss for Scenario 2.

(c) Packet loss for Scenario 3.

(a)　　　　　　　　　　　　(b)

(c)　　　　　　　　　　　　(d)

APPARATUS FOR TRANSMITTING ENCODED VIDEO STREAM AND METHOD FOR TRANSMITTING THE SAME

BACKGROUND OF THE INVENTION

1. Field of the Disclosure

Embodiments of the present invention relates to an apparatus and method for transmitting encoded video stream.

2. Discussion of the Related Art

High Definition (HD) video streaming over WLANs has become a viable and important technology as network bandwidth continues to improve and the use of Smart-phones, Mobile Internet Devices, and Wireless display devices increases.

Some notable HD wireless streaming technologies include Apple AirPlay®, Intel WiDi®, and Cavium WiVu®, which are deployed in an ad hoc mode. The state-of-the-art video compression standard H.264 facilitates wireless video streaming by providing more efficient compression algorithm and thus less data needs to be transmitted through the network. Moreover, H.264 provides many error-resilience and network-friendly features, such as Data Partitioning (DP), Flexible Macroblock Ordering (FMO), and Network Adaption Layer (NAL) structure. However, wireless HD video streaming still faces many challenges. This is because, unlike transmitting traditional data, video streaming requires not only data integrity but also frames have strict playout deadline in the presence of packet delay and loss. Both of these factors are also closely related to streaming protocols.

Transmission Control Protocol (TCP) and User Datagram Protocol (UDP) are the two fundamental Transport Layer protocols used to transmit video data through the network. TCP is a reliable protocol but delay and bandwidth consumption increase due to re-transmissions of lost packets, which further increase the likelihood of packet loss. For example, HTTP-based streaming video relies on TCP. Much work has been done to hide or reduce delay caused by TCP, but this remains a major problem for real-time video streaming. By contrast, UDP offers minimal delay but does not guarantee delivery of packets. These lost packets cause errors that propagate to subsequent frames.

Although considerable amount of research has been done on both TCP and UDP to improve video streaming in general, little attention has been paid to utilize the advantages of using both TCP and UDP for wireless video streaming. Recently, Porter and Peng proposed a Hybrid TCP/UDP streaming method, which relies on TCP to transmit higher priority data and UDP to transmit lower priority data. However, they did not actually implement their method in a realistic network environment and instead used a tool to randomly remove data from an encoded video locally in order to simulate packet loss caused by UDP. This evaluation process lacks rigor and prevents them from providing meaningful results, such as visual quality and buffering time caused by using both TCP and UDP.

The following discusses several existing prior patents related to the video streaming. In U.S. Pat. No. 8,356,109, the quality of received video is improved by sending intra-coded frames and high-priority inter-coded frames over multiple TCP channels, and low-priority inter-coded frames over multiple UDP channels. This invention focuses on networks with multiple communication channels. In addition, the segregation of high-priority and low-priority data is done at the frame level. However, multiple communication channels may not be always viable. For example, in a home environment, video streaming is done in a point-to-point fashion, which means only one communication channel is available. This invention is not applicable in this situation. Moreover, this invention can transmit only complete frames over TCP channels.

In U.S. Publication No. 20120173748, both TCP and UDP protocols are used to stream media. The invention delivers the higher-priority media data to the client over TCP, and the lower-priority media data to the client over UDP. Although this invention does not specifically define what higher-priority and lower-priority data are, it states the following: "In an instance in which the media data is encoded as a series of pictures, the first portion of media data comprises higher-priority intra-coded pictures and the second portion of the media data comprises one or more lower-priority inter-coded pictures." The above statement clearly indicates that this invention partitions the data at the frame level. Moreover, higher-priority data is defined as intra-coded frames, while lower-priority data as inter-coded frames. In addition, this invention does not consider initial buffering and re-buffering, which are key metrics for Quality of Experience (QoE) of video streaming.

In U.S. Pat. No. 6,771,594, this invention monitors Quality of Service (QoS) of real-time data streaming. If the QoS falls below a threshold, the real-time data is routed through a reliable network service such as TCP. If QoS is adequate, data is routed to a non-reliable network service such as UDP. The quality of received real-time data may fluctuate by using this invention. When QoS falls below a threshold and thus the rest of data is routed to TCP, there is already a period of time during which the streaming video quality will be poor. Therefore, the quality of streaming may not be consistent because of the constant switching between TCP and UDP. Moreover, this invention applies only to Voice over IP (VoIP), which is significantly less data intensive than video streaming.

SUMMARY OF THE INVENTION

Accordingly, embodiments of the present invention are directed to an apparatus and method for transmitting encoded video stream that substantially obviate one or more problems due to limitations and disadvantages of the related art.

An aspect of embodiments of the present invention is directed to provide an apparatus for transmitting encoded video stream that utilizes the benefits of combining TCP and UDP.

Another aspect of embodiments of the present invention is directed to provide an apparatus for transmitting encoded video stream that subdivide a video stream in to sub-steams on-the-fly, and for each sub-stream, send high priority data via TCP and low priority data via UDP.

Another aspect of embodiments of the present invention is directed to provide an apparatus for transmitting encoded video stream that overlap the transmission of the sub-streams to minimize initial buffering and reduce the possibility of rebuffering for long videos.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided an apparatus for transmitting encoded video stream that may comprises an encoder configured to encode video stream using predetermined compression standard; a parser configured to subdivide the encoded video stream into a plurality of sub-streams and parse the sub-streams; a MUX configured to segregate a first data which is NAL unit having SPS, PPS, or slice header and a second data which is NAL unit having slice data from the parsed sub-stream; a first packet generator configured to generate a TCP packet using the first data by the sub-stream and transmit the TCP packet through a TCP tunnel; and a second packet generator configured to generate a UDP packet using the second data by the sub-stream and transmit the UDP packet through a UDP tunnel.

In another aspect of embodiments of the present invention, there is provided a method for transmitting encoded video stream that may comprises encoding video stream using predetermined compression standard; subdividing the encoded video stream into a plurality of sub-streams; segregating a first data which is NAL unit having SPS, PPS, or slice header and a second data which is NAL unit having slice data from the sub-stream; generating a TCP packet using the first data and a UDP packet using the second data; and transmitting the TCP packet through a TCP tunnel and the UDP packet through a UDP tunnel.

It is to be understood that both the foregoing general description and the following detailed description of the present invention are exemplary and explanatory and are intended to provide further explanation of the invention as claimed. Further, research for the invention was supported in part by LCD Laboratory LG Display Co., Ltd., and the Ministry of Education Science and Technology (MEST).

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, an apparatus for transmission of encoded video stream and Method for the same according to the present invention will be described in detail with reference to the accompanying drawings.

Firstly, the relationship between how H.264 video is encoded and streamed, and the effect of packet delay and loss on its visual quality will be described.

H.264 is the state-of-the-art video compression standard. Compared to its predecessors, H.264 provides more aggressive compression ratio and has network friendly features that make it more favorable for mobile video streaming. There are several characteristics of H.264, and video compression in general, that are important for efficient wireless video streaming. The two most important characteristics are the syntax for encoding video data to bitstream data and how some part of this information is more important than the others.

A video stream encoded by H.264 consists of a sequence of Group of Pictures (GOPs). Each GOP consists of an intra-frame (I-frame), predicted-frames (P-frames), and bi-predicted frames (B-frames). An I-frame contains all the data required to reconstruct a complete frame and does not refer to other frames. In contrast, P-frames and B-frames require reference frame(s) during decoding. If a reference frame contains errors, these errors will propagate through subsequent frames that refer to this frame. Since an I-frame does not depend on any other frame, error propagation will cease when a new I-frame arrives. Consequently, I-frames should be given higher priority if possible during video streaming.

Figure 1:
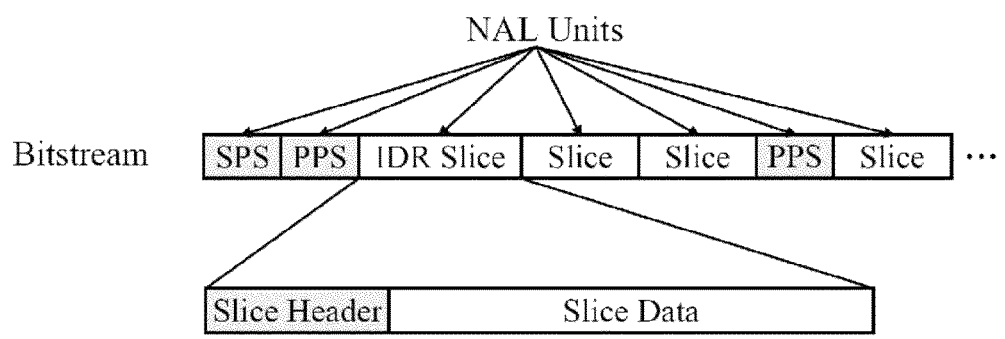
FIG. 1 shows the structure of the H.264 bitstream syntax.

The structure of the H.264 bitstream syntax is shown in FIG. 1, which consists of series of Network Adaption Layer (NAL) units. Three common NAL units are Sequence Parameter Set (SPS), Picture Parameter Set (PPS), and slice. SPS contains parameters common to an entire video, such as profile and level the coded video conforms to. Therefore, if SPS is lost, then the entire video cannot be decoded. PPS contains common parameters that are applied to a sequence of frames, such as entropy coding mode employed. If PPS for a sequence of frames is lost, then these frames cannot be decoded. A slice is a unit for constructing a frame, and a frame can have either a single slice or multiple slices. A slice can be I-slice, P-slice, B-slice, or Instantaneous Decoder Refresh (IDR) slice. An IDR slice is a special form of I-slice that indicates that this slice does not reference any slice before it, and is used to clear the contents of the reference frame buffer. A slice contains a slice header and a slice data containing a number of macroblocks (MBs). A slice header contains information common to all the MBs within a slice. Each slice is then subdivided into one or more packets for transmission. Thus, if a packet containing the slice header is lost, then the entire slice cannot be decoded even if the rest of the slice data is properly received.

Figure 2:
FIG. 2 illustrates the effect of packet loss on a frame from a HD video clip.
Figure 2:
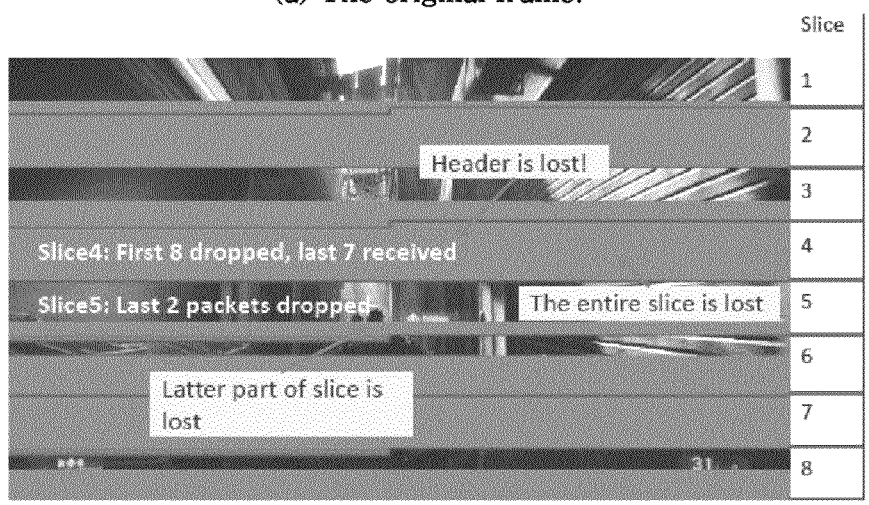

FIG. 2 illustrates the effect of packet loss on a frame from a HD video clip called "battlefield" streamed via UDP using VLC media player, and analyzed using Wireshark and Elecard StreamEye Studio. FIG. 2*a* shows the original transmitted frame, while FIG. 2*b* shows the received frame with some information missing due to packet loss. In this example, the slice header for Slice 4 is lost, thus the entire slice cannot be decoded. In contrast, the slice header for Slice 5 is received but the last two RTP packets containing a part of the slice data are lost, which allows most of the slice to be decoded. Afterwards, Error Concealment (EC) techniques can be used to recover the lost information with some artifacts (which is not shown). Therefore, PPS, SPSs, and slice headers are the most important data, and thus more care should be given to them during video streaming.

Data Partitioning (DP) is an error-resilience feature in H.264. The coded data for each slice is placed in three separate data partitions A, B, and C. Partition A contains the slice header and a header for each MB (i.e., MB type, quantization parameter, and motion vectors), Partition B contains Coded Block Patterns (CBPs) and coefficients for intra-coded MBs, and Partition C contains CBPs and coefficients for intercoded MBs. To decode Partition B, Partition A must be present. To decode Partition C, both Partition A and B must be present. DP can be used with Unequal Error Protection (UEP) methods to improve streaming performance. Although DP is a powerful tool for error resiliency, it has not yet been widely adopted because it requires videos to be re-encoded and 802.11e networks.

Existing streaming protocols include Real Time Streaming Protocol (RTSP), HyperText Transfer Protocol (HTTP), Microsoft Media Server (MMS), and Real-time Transport Protocol (RTP). Note that RTSP, HTTP, MMS, and RTP are Application Layer protocols so they do not deliver the streams themselves. For example, RTP uses UDP or TCP to deliver multimedia data. RTSP, HTTP, and MMS add more control features for streaming but they also use TCP or UDP to deliver multimedia data. RTSP allows a client to remotely control a streaming media server. For example, a client can play, pause, and seek a video during streaming. RTSP can be used together with RTP Control Protocol (RTCP) to obtain statistical data on Quality of Service (QoS). Typically, RTSP uses TCP to deliver control signal and RTP/UDP to deliver multimedia data. HTTP also allows a client to control streaming, and uses TCP to transmit both multimedia and control data. Since HTTP uses TCP, packets are never lost. Another advantage of HTTP is that it works across firewalls as the HTTP port is usually turned on. However, HTTP will incur high end-to-end delay when lost packets need to be retransmitted. RTP typically uses UDP to deliver multimedia data. An RTP header contains a sequence number and a timestamp. Sequence number is increased by one for each packet sent and is used for packet-loss detection. Timestamp can be used to synchronize multiple streams such as video and audio. Note that there is no control functionality by using only RTP/UDP. For our purpose, the focus is on RTP/UDP and RTP/TCP direct streaming as they are fundamental to all other streaming protocols.

UDP is generally accepted to be more suitable than TCP for real-time video streaming since it offers low end-to-end delay for smooth video playout. Although UDP is prone to data loss, multimedia data to a certain degree (unlike traditional data) is loss-tolerant. In addition, a decoder uses EC (Error Concealment) techniques to reduce the artifacts caused by data loss. Numerous EC techniques have been developed to reduce the impact caused by packet loss. However, if lost packets contain important data, such as SPSs, PPSs, and slice headers, the decoder simply cannot reconstruct the video even with the aid of EC. In order to tolerate packet loss caused by UDP streaming, Unequal Error Protection (UEP) is often used. UEP aims to prioritize important data over the others because some syntax elements are more critical than others. A basic UEP method is to send important packets more than once, which raises the probability for the packets to arrive at the receiver. More advanced UEP methods incorporate Forward Error Correction (FEC). By using FEC to code important packets with redundancy, a receiver can recover these lost packets without retransmission. However, FEC introduces additional overhead, which increases network bandwidth required to transmit video. Despite the conventional wisdom that TCP is not desirable for streaming, a significant fraction of commercial video streaming traffic uses it. TCP provides guaranteed service so the transmitted packets are always preserved. Nevertheless, TCP's re-transmission and rate control mechanisms incur delay, which can cause packets to arrive after the playout deadline. A typical solution for this problem is to add a buffer in front of the video decoder. At the beginning of video streaming, the decoder waits until the buffer is filled before displaying video to accommodate initial throughput variability or inter-packet jitters. This waiting time is called initial buffering. After the decoder starts to decode video data in the buffer, decrease in throughput within a TCP session may cause buffer starvation. When this happens, the decoder stops displaying video until sufficient number of video packets are received. This waiting time is called rebuffering. Buffering prevents late packets to be dropped; however, network congestion can cause long initial buffering and frequent rebuffering that degrades users' experience. Much research has been done on determining the appropriate buffer size to reduce the frequency of rebuffering.

Another approach to improve wireless video streaming is using IEEE 802.11e networks, which define a set of QoS enhancements through modifications to the Media Access Control (MAC) layer. In an 802.11e network, delaysensitive data such as video and audio can be assigned to higher priority class. If contention occurs at the MAC layer, smaller contention window size is used to transmit data with higher priority, and thus lower transmission delay can be achieved. 802.11e is specially tailored for multimedia, but it has not been widely adopted perhaps due to the hardware changes required.

Figure 3:
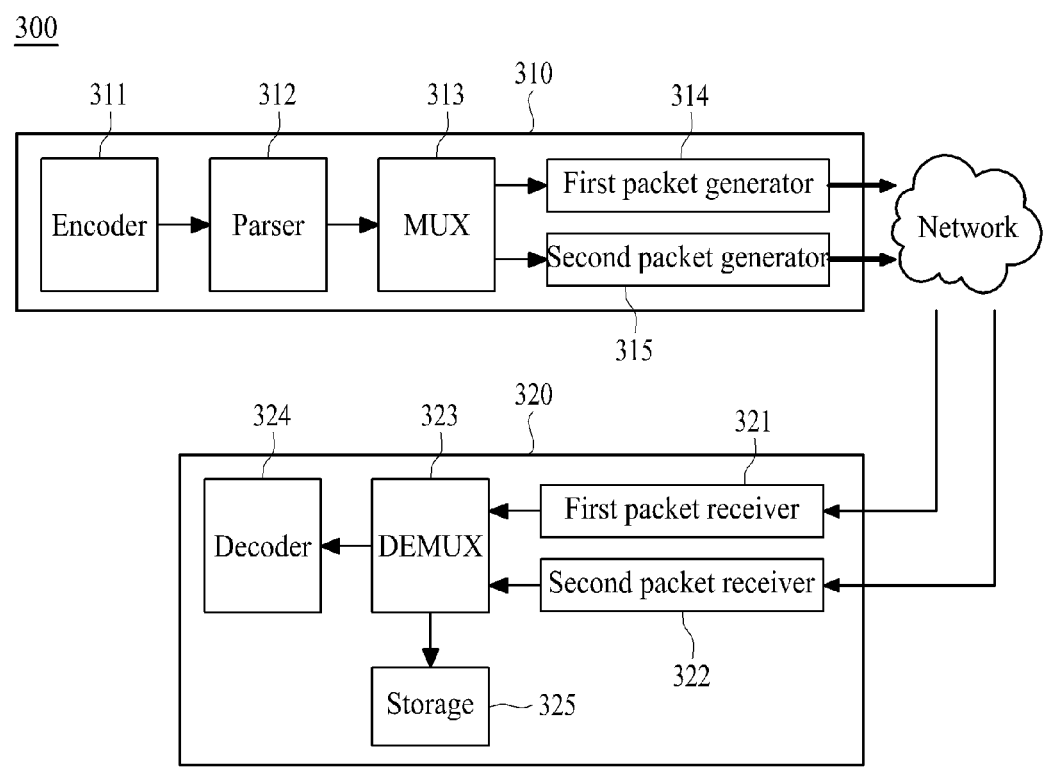
FIG. 3 shows an apparatus for transmitting encoded video stream according to first embodiment of the present invention.

FIG. 3 shows an apparatus for transmitting encoded video stream according to first embodiment of the present invention. The apparatus 300 comprises a sender 310 and a receiver 320.

The sender 310 comprises an encoder 311, a parser 312, a MUX 313, a first packet generator 314, and a second packet generator 315.

The encoder 311 encodes the raw video stream using predetermined video compression standard. The predetermined video compression may be H.26X such as H.264 or H.265. In one embodiment of the present invention, the encoder 311 encodes the raw video stream not to include DP (Data partitioning) profile.

The parser 312 subdivides the encoded video stream into a plurality of n-second sub-streams. The sub-stream consists of a plurality of frames. The parser 312 parses the plurality of sub-streams to obtain SPSs, PPSs, slice headers, and slice data from each sub-stream. Before streaming, the parser 312 returns the sub-stream's syntax information such as start address and length, and type of each NAL unit as input to the MUX 313. In one embodiment of the present invention, the parser 312 may be a H.264 Syntax parser. In one embodiment of the present, during streaming, each NAL unit is encapsulated into an RTP packet.

The MUX 313 segregates a first data and a second data from the obtained SPSs, PPSs, slice headers, and slice data by the sub-stream. The first data which is high priority data includes the SPSs, PPSs, and slice headers. The second data which is low priority data includes the slice data. For this, the MUX uses the stored syntax information to determine whether the RTP packet contains a NAL unit that is the first data. If the RTP packet contains an important NAL unit which is first data, the MUX will steer the RTP packet containing the important NAL unit to the first packet generator 314, the RTP packet containing NAL unit which is the second data to the second packet generator 315.

The first packet generator 314 generates TCP packets using the first data to transmit the TCP packets through TCP tunnel. The second packet generator 315 generates UDP packets using the second data to transmit the UDP packets through UDP tunnel. In one embodiment of the present invention, a TCP session for transmitting the TCP packets and a UDP session for transmitting the UDP packets are active during video streaming. In other words, the apparatus 300 uses dual tunneling (TCP+UDP) for transmitting the encoded video stream.

In one embodiment of the present invention, the sender 310 will first send the first data via TCP and then send the rest of data (the second data) via UDP. In other words, the sender 310 will first send the TCP packet including the first data and then send the UDP packets including the second data. For a 12-second video stream, the initial buffering (i.e., the time spent sending the first data via TCP) is less than 2 seconds. However, initial buffering will be unacceptably long when streaming an entire video stream. Thus, the sender 310 can send the UDP packet included in the n-th sub-stream and the TCP packet included in the n+1-th sub-stream simultaneously to reduce the initial buffering requirement. In other words, in the present invention overlap transmission of the sub-streams.

Figure 4:
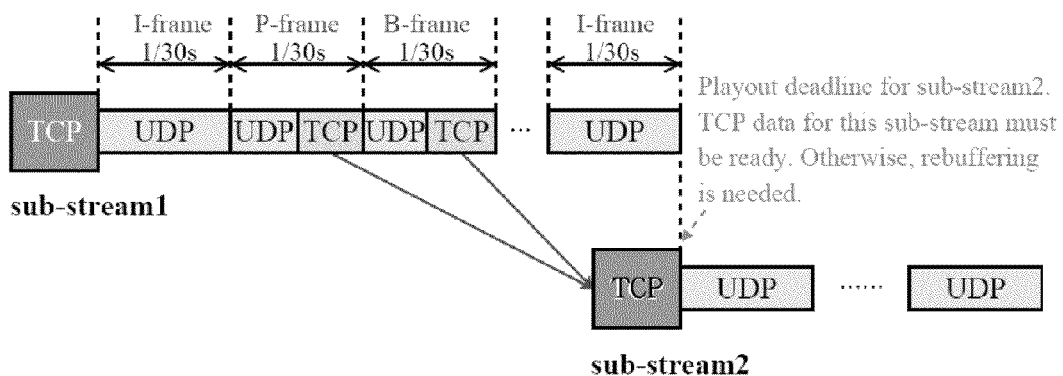
FIG. 4 illustrates sub-stream overlapping method according to the present invention.

FIG. 4 illustrates the sub-stream overlapping. As illustrated in FIG. 4, an entire video stream is subdivided to several n-second sub-streams. Note that FIG. 4 only shows the first two sub-streams. The sender 310 will only transmit the TCP packet including the first data for the sub-stream 1 via TCP and then start the normal UDP streaming. As long as the sender 310 is not sending any UDP packet, it will send the TCP packet including the first data for the sub-stream 2 via TCP. The sender 310 will stop video streaming and perform rebuffering if the TCP packet including the first data for the sub-stream 1 is not ready by the time it has to be played out.

In other words, the process for sub-stream overlapping can be divided into the following four steps. In step 1, the video stream is divided into several n-sec sub-streams. In step 2, the first data for only the first n-sec sub-stream is transmitted via TCP. In step 3, normal UDP streaming is started. In step 4, the first data for the next n-sec sub-stream(s) via TCP if network is relatively idle.

For step 4, the condition that determines whether network is relatively idle is done by monitoring the Network Layer queue (not shown). If the number of packets in the queue is less than the threshold, the present invention will send TCP packets for next sub-stream(s) during UDP streaming for previous sub-stream.

The receiver 320 comprises a first packet receiver 321, a second packet receiver 322, DEMUX 323, and decoder 324.

The first packet receiver 312 receives the TCP packet through the TCP tunnel and delivers the TCP packet to the DEMUX 323. The second packet receiver 322 receives the UDP packet through the UDP tunnel and delivers the UDP packet to the DEMUX 323.

The DEMUX 323 drops late UDP packets and merges on-time UDP packets with TCP packets. Afterwards, DEMUX sends on-time UDP packets together with TCP packets to the decoder 324. In detail, when receiving a TCP packet, the DEMUX 323 will store the TCP packet in a storage 325. When receiving a UDP packet, the DEMUX 323 will first parse the UDP packet to obtain the RTP timestamp. If the timestamp is greater than the playout deadline, the DEMUX 323 will drop thus UDP packet because it is late. If the timestamp is less than the playout deadline, the DEMUX will then parse the UDP packet to obtain the RTP sequence number. Afterwards, the DEMUX will parse the storage 325 to check whether there are any TCP packets whose RTP sequence number is smaller than the RTP sequence number of the UDP packet. If so, the DEMUX 323 will merge these TCP packets with the current UDP packet and delivers them to the decoder 324.

The decoder 324 decodes the UDP packets together with TCP packets to reconstruct the video stream and play the reconstructed video stream through a display. The decoder 324 may be implemented using FFmpeg.

Figure 5:
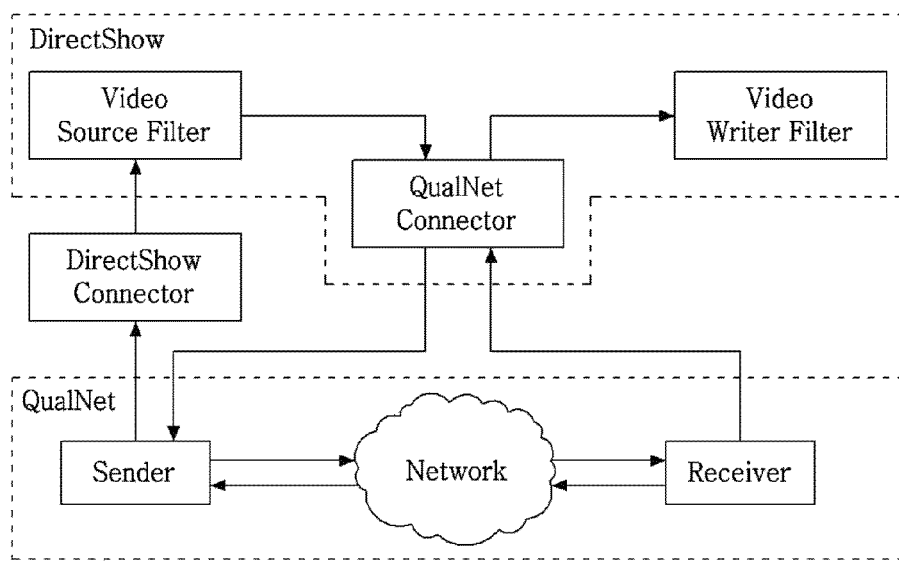
FIG. 5 shows the general structure of OEFMON.

The apparatus 300 according to the first embodiment of the present invention can be implemented within Open Evaluation Framework for Multimedia Over Networks (OEFMON), which integrates the Direct-Show multimedia module and the QualNet network simulator. A simplified diagram of OEFMON is shown in FIG. 5. As shown in FIG. 5, the main components are QualNet Connector, Video Source Filter, and Video Writer Filter. The QualNet Connector is responsible for RTP packetization. The Video Source Filter reads an H.264 file and sends the data to the QualNet Connector, and the Video Writer Filter writes the decoded frame data to a raw video file. The detailed explanation of the key components of OEFMON for implementation of the apparatus 300.

OEFMON implements UDP streaming in the QualNet network simulator. In order to implement Dual Tunneling, the existing code for UDP streaming required modification and a TCP streaming module needed to be implemented. The QualNet is a discrete-event simulator, and an event is represented by a data structure called MESSAGE. The original code already contains MESSAGE for UDP and there is a pair of MESSAGEs (one for the sender 310 and another for the receiver 320). The changes required for UDP mainly involved restructuring the code to handle the corresponding MESSAGEs. However, the implementation of TCP requires more MESSAGEs because it uses three-way handshaking. QualNet APIs such as APP_TcpOpenConnectionWithPriority (request to open TCP socket) and MESSAGEs such as MSG_APP_FromTransListenResult (respond to request) must be properly handled before transmitting video stream. To enable Dual Tunneling, the functions for handling both UDP and TCP MESSAGEs were implemented inside a single application file called app_fdspvideo.cpp in QualNet.

The parser 312 was developed based on an open source library called h264bitstream. The parser 312 was implemented within QualNet and linked to app_fdspvideo.cpp. Before streaming, the parser 312 parses the video bitstream and returns its syntax information (such as start address and length, and type of each NAL unit) as input to the MUX 313. During streaming, each NAL unit is encapsulated into an RTP packet by the QualNet Connector in OEFMON. At the same time, the MUX 313 uses the stored syntax information to determine whether an RTP packet contains a NAL unit that is SPS, PPS or slice header. If an RTP packet contains an important NAL unit, the MUX 313 will steer it to the TCP tunnel; otherwise, the packet will be steered to the UDP tunnel.

When the receiver 320 receives a TCP packet, the DEMUX 323 will store the packet in a file called "tcpdata.h264" on the disk drive. When the receiver 320 receives a UDP packet, the DEMUX 323 will first parse the UDP packet to obtain the RTP timestamp. If the timestamp is greater than the playout deadline, the DEMUX 323 will drop this UDP packet because it is late. If the timestamp is less than the playout deadline, the DEMUX 323 will then parse the UDP packet to obtain the RTP sequence number. Afterwards, the DEMUX 323 will parse the "tcpdata.h264" file to check whether there are any TCP packets whose RTP sequence number is smaller than the RTP sequence number of the UDP packet. If so, the DEMUX 323 will merge these TCP packets with the current UDP packet and send them to the decoder 324.

Figure 6:
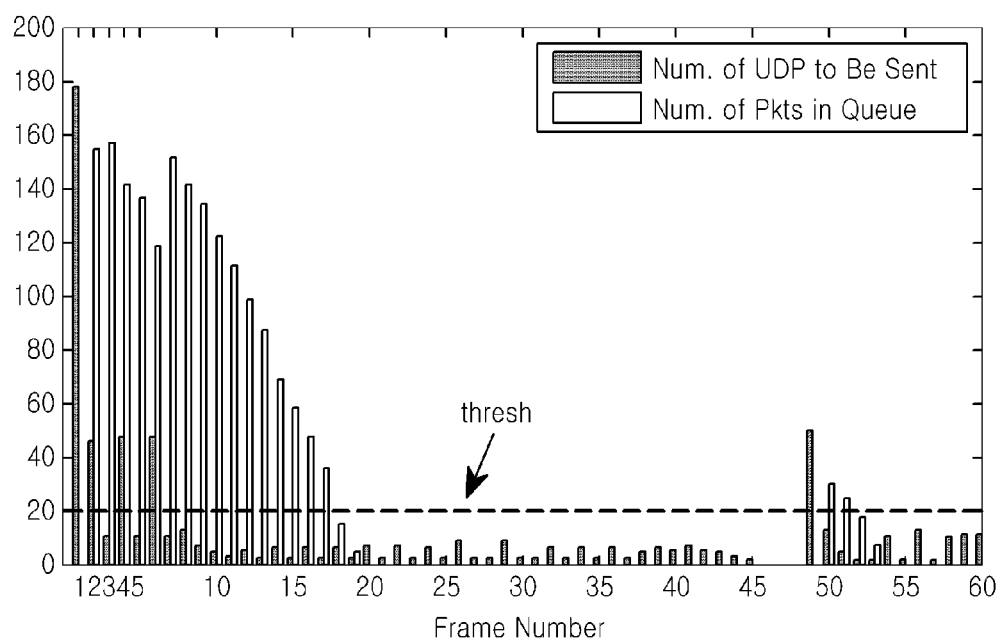
FIG. 6 shows queue status during streaming.

FIG. 6 shows the queue status during video streaming using pure-UDP for Scenario 1 which will be described below. The X-axis represents each frame that the apparatus 300 is sending. "Num. of Pkts in Queue" indicates the number of packets in the Network Layer queue when sending each frame. "Num. of UDP to Be Sent" indicates the number of UDP packets that comprise the current frame. These are packets that are about to be pushed onto queue and sent out. For example, for Frame 1, the queue should be empty, and therefore, "Num. of Pkts in Queue" is 0. Frame 1 consists of 177 UDP packets and therefore "Num. of UDP to Be Sent" is 177. The choice of the threshold depends on network condition and sub-stream length. If a network is congested, "Num. of Pkts in Queue" will drop slowly. For example, "Num. of Pkts in Queue" may not drop to 20 until Frame 30 instead of Frame 18 as shown in FIG. 6. In order to allow TCP data for the next sub-stream to be ready before its playout deadline, the threshold needs to be increased to a value higher than 20 so that there is more time for the apparatus 300 to send TCP data. When the sub-stream length increases, TCP data required for the next sub-stream increases, but at the same time, the time available to transmit TCP data also increases. If network is not congested, there will be plenty of time available to send TCP data. In contrast, if the network is congested, "Num. of Pkts in Queue" can drop so slowly that, even if the time available to send TCP data increases, there may not be enough time to transmit TCP data. In this situation, the threshold should be increased. In this present invention, 20 packets are chosen as the threshold and 10 seconds are chosen as the sub-stream length.

Figure 7:
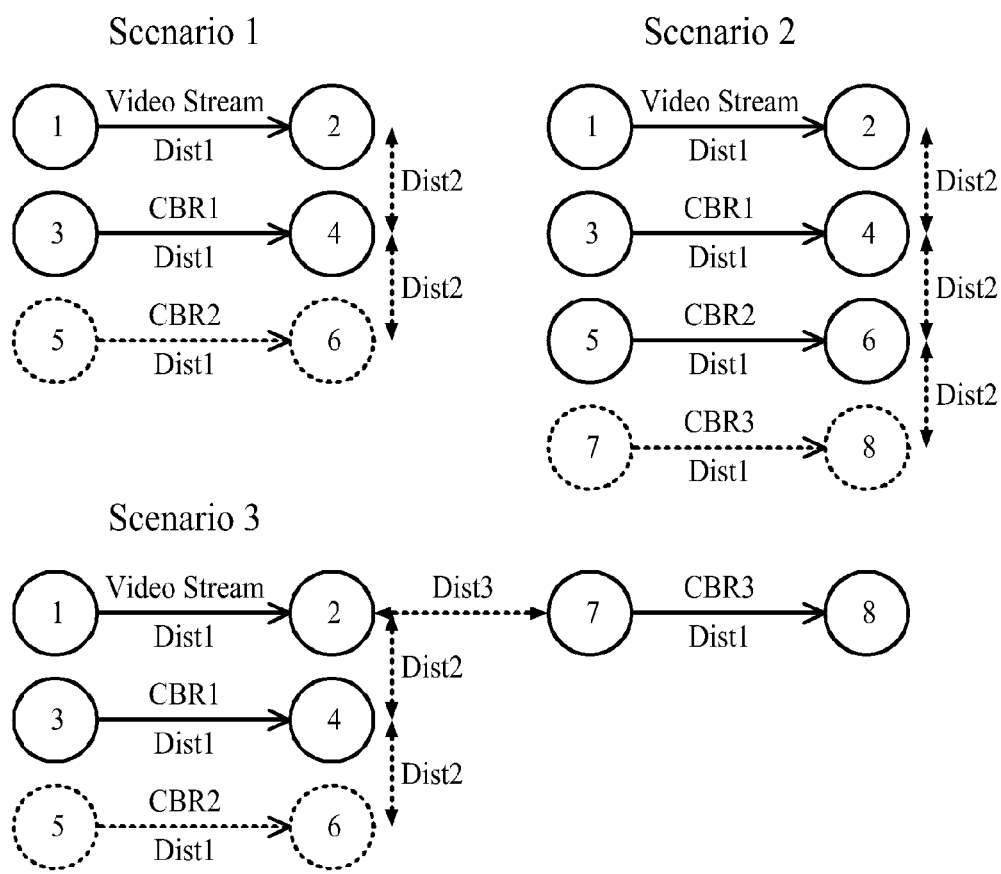
FIG. 7 shows simulated network scenarios.

A simulation and simulation results of the apparatus and method for transmitting encoded video stream according to first embodiment of the present invention will be described. The primary video stream selected for experiments of the present invention is 1,200 frames of raw HD YUV video (40 seconds of 1920×1080 @30 fps) from an "African Cats" trailer. The YUV file is encoded using x264 with an average bitrate of 4 Mbps and single slice per frame 1. Using OEF-MON, a 802.11g ad-hoc network with 54 Mbps bandwidth was setup and three network scenarios were created to evaluate video streaming performance. The placement of nodes for three scenarios shown in FIG. 7 model a home environment. In Scenario 1, the node pair 1 and 2 streams the primary video over the network. At the same time, two additional pairs of nodes generate constant bitrate (CBR) data, marked as CBR1 and CBR2 in FIG. 7, as background traffic. Scenario 2 adds one more CBR data (marked as CBR3) in the figure. Scenario 3 repeats the network traffic of Scenario 1, but the node pair 7 and 8 is added and positioned in a classic hidden-node arrangement. Parameters in FIG. 7 are defined as follows: Dist1=5 m, Dist2=1 m, Dist3=50 m, CBR1=20 Mbps, CBR2=20 Mbps, and CBR3=10 Mbps (except for Scenario 3 where CBR3=5 Mbps). Based on these values, the network becomes saturated for Scenario 2. Streaming is performed by packetizing each NAL unit. If the size of a NAL unit is less than or equal to the maximum transmission unit (MTU) size, one RTP packet contains only one NAL unit. If the size of a NAL unit is greater than the MTU size, the NAL unit will be fragmented into multiple RTP packets. After video streaming completes, the sent and received video stream are decoded using FFmpeg and PSNR values are computed for the two YUV files using Avisynth. Since PSNR calculation for missing frames and two identical frames are not well defined, this paper uses 0 dB as the PNSR value for missing frames and follows the method used by Avisynth where 111 dB indicates perfect PSNR. In addition to PSNR information, initial buffering and rebuffering are recorded to evaluate end-to-end delay.

Figure 8:
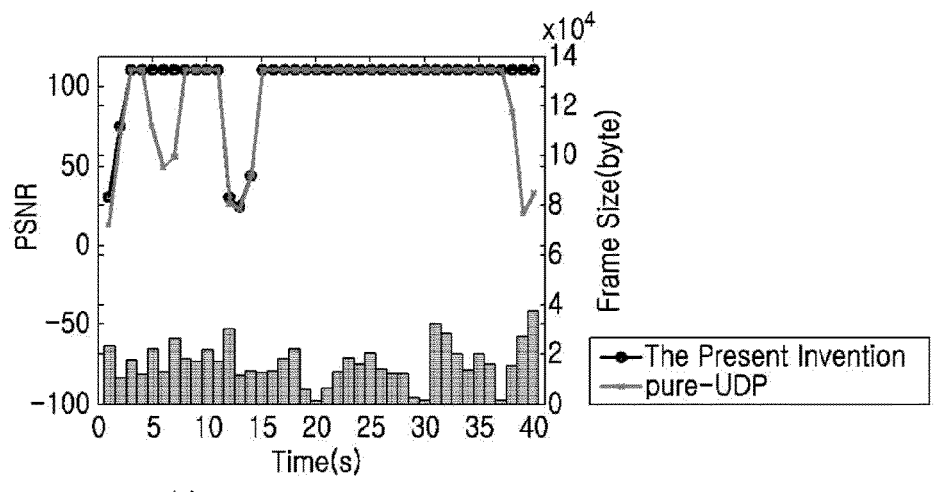
FIG. 8 shows PSNR comparison for all three scenarios.
Figure 8:
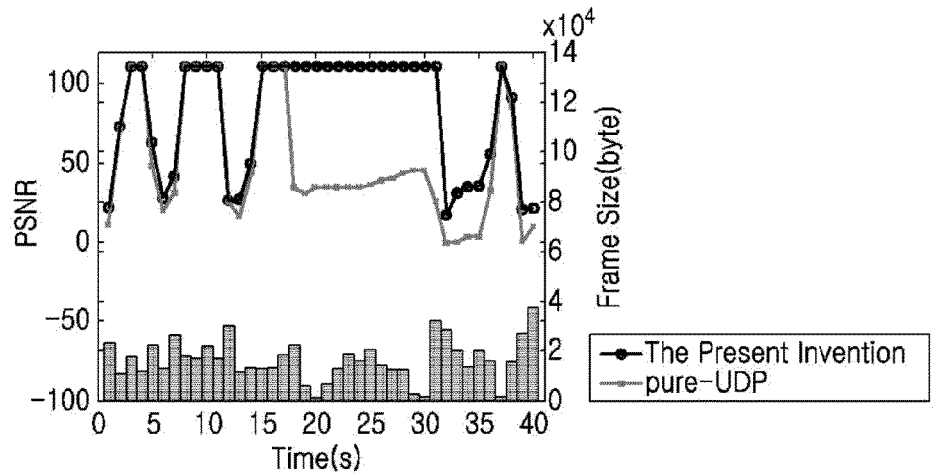
Figure 8:
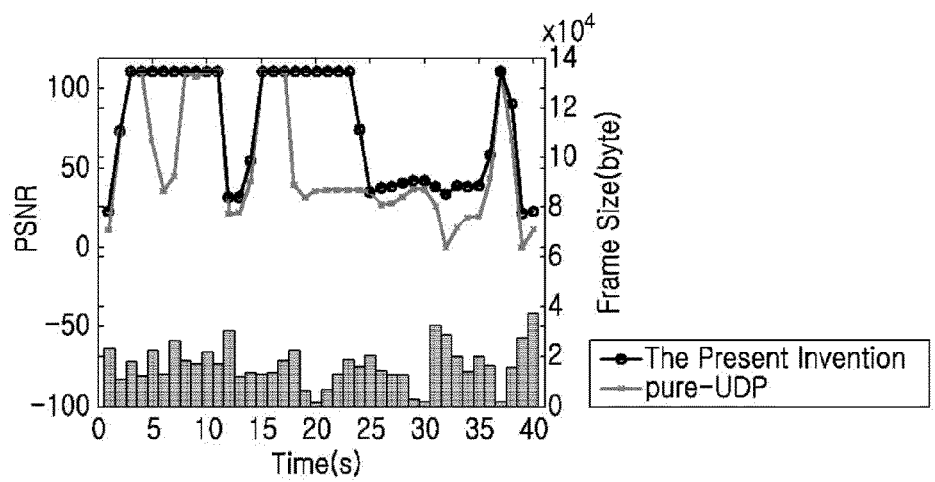
Figure 9:
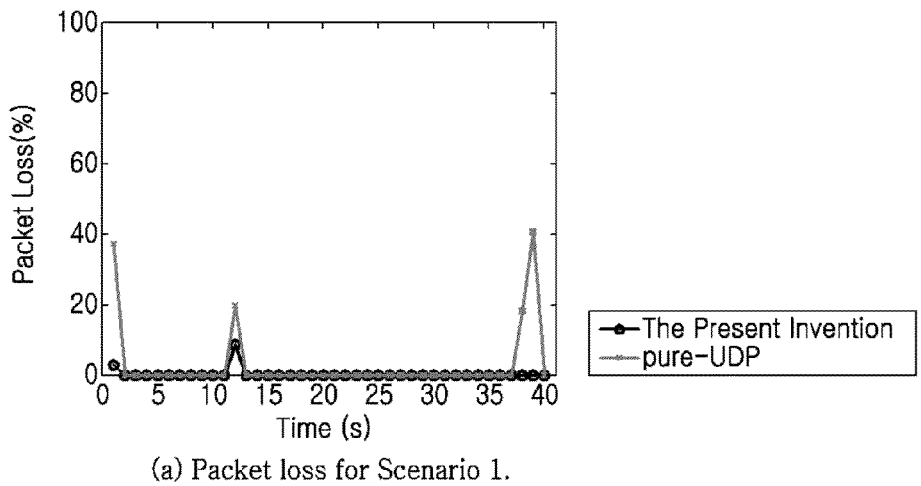
FIG. 9 shows packet loss for all three scenarios.
Figure 9:
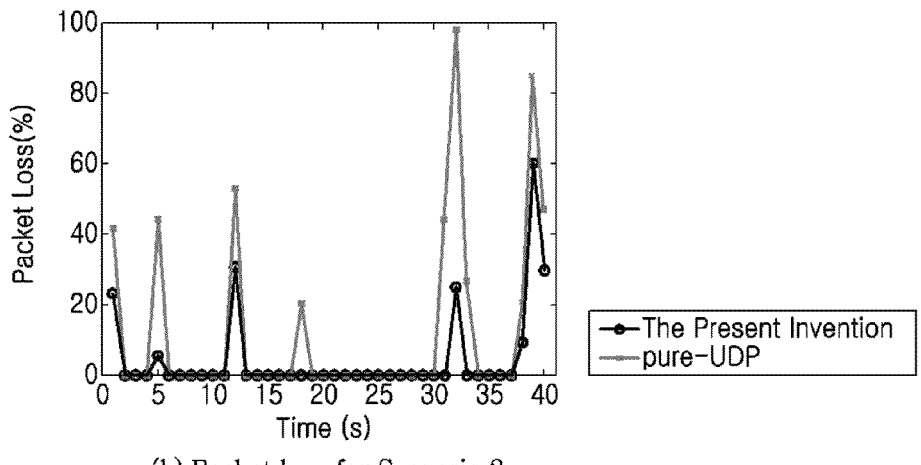
Figure 9:
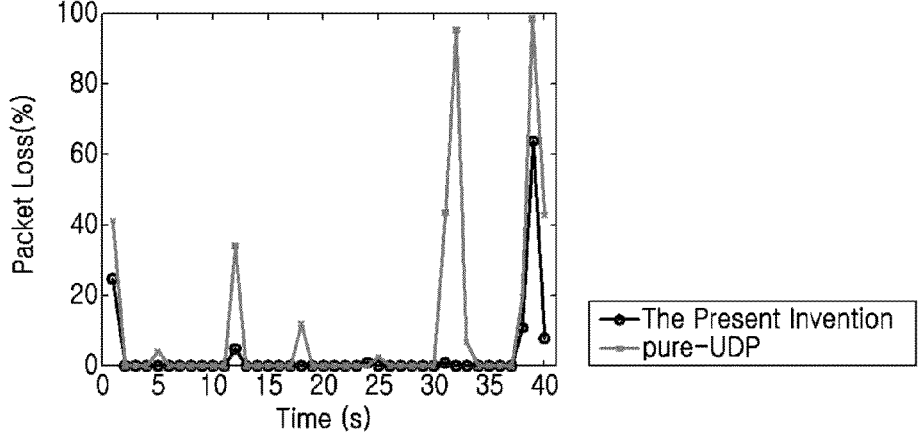
Figure 10:
FIG. 10 shows the decoded Frame 134 according to the present invention in Scenario 2.

The main objective for the experiments is to show the advantage of the present invention over traditional pure-UDP and pure-TCP streaming methods. For the present invention, all the important data (SPS, PPSs, and slice headers) will be first sent via TCP and then the rest of data will be sent via UDP. The time spent sending all the important data in the present invention is treated as initial buffering. For the pure-TCP method, a buffer is added to simulate initial buffering and rebuffering. In order to compare between the present invention and pure-TCP, the size of the buffer for pure-TCP is properly adjusted so that both methods have the same initial buffering time. The PSNR comparison for all three scenarios are shown in FIG. 8, which also includes frame size. Since 1200 frames are too many to fit in a graph, PSNR, packet loss, and frame size are all averaged over 1 second (which translates to 30 frames). In addition, PSNR and packet loss for the pure-TCP method are omitted because it always achieves PSNR of 111 dB and 0% packet loss. For Scenario 1 shown in FIG. 8*a*, as expected PSNR for pure-UDP is worse than the present invention. Pure-UDP achieves an average of 93 dB, while the present invention achieves 102 dB. For Scenario 2 shown in FIG. 8*b*, the pure-UDP method has an average PSNR value of 51 dB, which is much lower than the present invention method with 83 dB. For Scenario 3 shown in FIG. 8*c*, the node pair 7 and 8 causes a hidden node effect further degrading PSNR and delay compared to Scenarios 1 and 2. Pure-UDP achieves an average PSNR value of 52 dB. In contrast, the present invention has an average PSNR value of 76 dB, which is still better than pure-UDP. FIG. 9 shows packet loss ratios for all three scenarios. When FIGS. 8 and 9 are considered together, there is a direct correlation between packet loss and PSNR. In these graphs, each PSNR degradation is caused by some packet loss. For example, although it is hard to observe due to the whole-second averaging process, in FIG. 8*a* there is packet loss ratio of 0.2% at 5 seconds for pure-UDP, which reduces PSNR down from 111 dB to 76 dB. As can be seen in FIG. 9*b* and FIG. 9*c*, for packet loss higher than 85%, PSNR value is 0 dB indicating that frames are lost. In Scenario 1, 32 frames out of total of 1200 frames are lost for pure-UDP. In contrast, slice headers for all 1200 frames are received using the present invention, and thus all 1200 frames are reconstructed/decoded. In Scenario 2, 148 frames are lost by using the pure-UDP method, whereas there is no missing frames for the present invention. In Scenarios 3, 103 frames are missing for pure-UDP. Again, the present invention experiences no missing frames because slice headers are prioritized using TCP. As discussed before, the presence of slice headers is critical for a decoder to reconstruct a frame. Once a slice header is properly received, the decoder can use various EC techniques to conceal missing MBs even if rest of data is lost. For example, FIG. 10 shows the decoded Frame 134, which is a P-frame, reconstructed from a single packet containing the slice header and part of the slice. The upper-left watermark shows the frame number 134, which is the information retrieved from the packet. The lower-right watermark shows frame number 132, which indicates that FFmpeg using EC copied information from the previous frame 132 to reconstruct the current frame 134. Table 1 shows the buffering requirements for all three scenarios.

TABLE 1

| | Streaming Method | Initial Buffering (sec.) | Rebuffering Count | Avg. Rebuffering Time (sec.) |
|---|---|---|---|---|
| Scenario1 | The Present Invention | 2.0 | 0 | N/A |
| | pure-UDP | 0.0 | 0 | N/A |
| | pure-TCP | 2.0 | 6 | 0.95 |
| Scenario2 | The Present Invention | 2.3 | 0 | N/A |
| | pure-UDP | 0.0 | 0 | N/A |

TABLE 1-continued

|  | Streaming Method | Initial Buffering (sec.) | Rebuffering Count | Avg. Rebuffering Time (sec.) |
|---|---|---|---|---|
|  | pure-TCP | 2.3 | 17 | 1.34 |
| Scenario3 | The Present Invention | 2.56 | 0 | N/A |
|  | pure-UDP | 0.0 | 0 | N/A |
|  | pure-TCP | 2.56 | 19 | 1.46 |

Both pure-TCP and the present invention have same initial buffering time, and increases from 2 seconds to 2.56 seconds as a reaction to network saturation. However, pure-TCP incurs frequent rebuffering. During 40 seconds of video streaming, rebuffering occurs 6~19 times and each lasts 0.95~1.46 seconds. Frequency of rebuffering is the main factor responsible for the variations in users' experience. Such a high frequency of rebuffering can be very annoying even though pure-TCP provides perfect visual quality. In contrast, the present invention does not have any rebuffering. This again shows that the present invention is very effective in a congested network because pure-UDP and pure-TCP tend to be unacceptable in terms of visual quality and delay, respectively. Table 2 shows the ready times and playout deadlines for sub-streams for the present invention.

TABLE 2

|  | Sub-stream | Ready Time (sec.) | Playout Deadline (sec.) |
|---|---|---|---|
| Scenario1 | 2 | 3.78 | 10 |
|  | 3 | 5.37 | 20 |
|  | 4 | 7.01 | 30 |
| Scenario2 | 2 | 4.80 | 10 |
|  | 3 | 7.92 | 20 |
|  | 4 | 11.47 | 30 |
| Scenario3 | 2 | 4.82 | 10 |
|  | 3 | 6.95 | 20 |
|  | 4 | 10.91 | 30 |

Note that sub-stream 1 is not listed in this table because its ready time is in fact the initial buffering time shown in Table 1. The playout deadline for each sub-stream is determined by its length, i.e., 10 seconds. As long as the ready time is less than playout deadline, no rebuffering is required. As network congestion increases, ready times also increase. However, ready times for all sub-streams are still much earlier than their playout deadlines. Therefore, no rebuffering is required as indicated in Table 1.

As indicated above, the ready times for sub-streams for all three scenarios are earlier than playout deadlines. For example, in Scenario 2, the 4th sub-stream's ready time is at 11.47 seconds, which is 18.53 seconds earlier than the playout deadline of 30 seconds. This implies that the network condition can handle more data to be prioritized and sent via the TCP tunnel. If the present invention can send additional data via TCP, the visual quality can be further improved.

Figure 11:
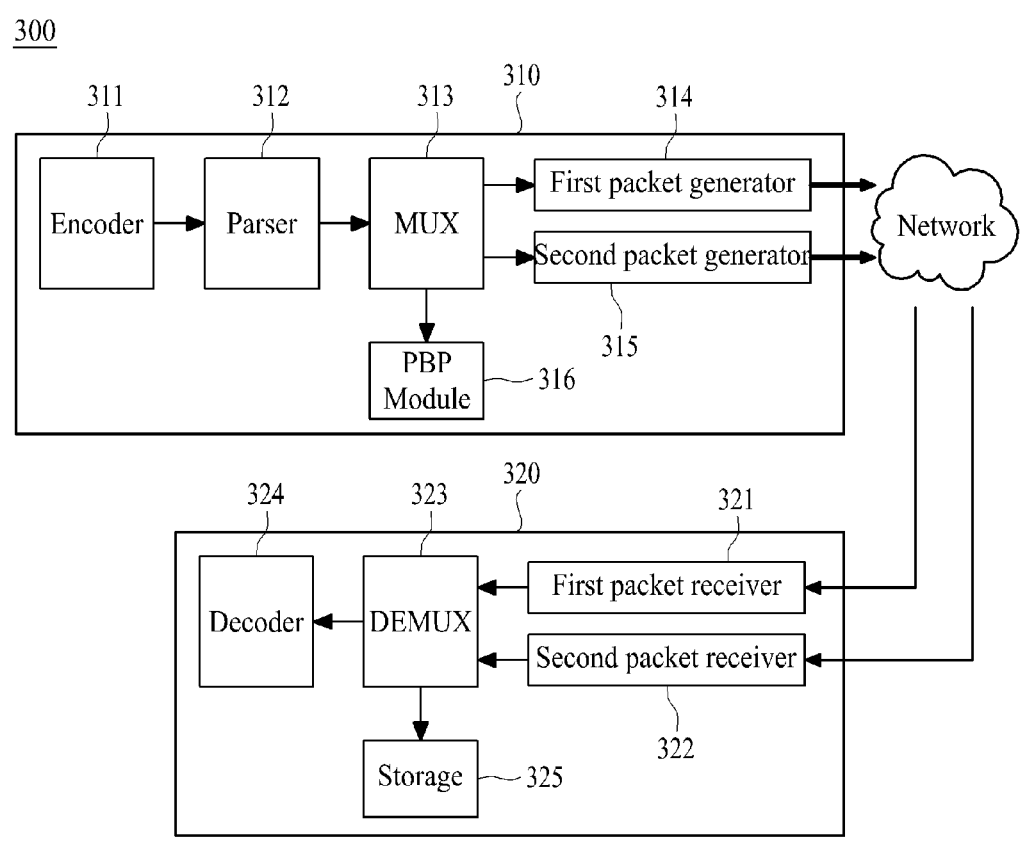
FIG. 11 shows an apparatus for transmitting encoded video stream according to second embodiment of the present invention.

In order to utilize the slack time (i.e., difference between sub-stream ready time and playout deadline) and further improve visual quality, the apparatus and method for transmitting encoded video stream according to second embodiment of the present invention is provided. FIG. 11 shows an apparatus for transmitting encoded video stream according to second embodiment of the present invention. As shown in FIG. 11, the apparatus 300 further comprises a new module 316 called Percentage Based Prioritization (PBP) (see FIG. 3) is added so that the apparatus 300 can prioritize more bitstream syntax elements in addition to SPS, PPS and slice header. The PBP module 316 selects syntax elements according to an input parameter called PERCENT. For example, if PERCENT is defined to be 10%, then 1 out of 10 UDP packets will be sent via TCP. The PBP module 316 extends the flexibility of the apparatus 300 because, if desired, any syntax element can be prioritized. In one embodiment of the present invention, the PBP module 316 is used to prioritize frames larger than 100 Kbytes. These large frames are usually I-frames, and therefore, are more important than B-frames.

A simulation and simulation results of the apparatus and method for transmitting encoded video stream according to second embodiment of the present invention will be described.

Figure 12:
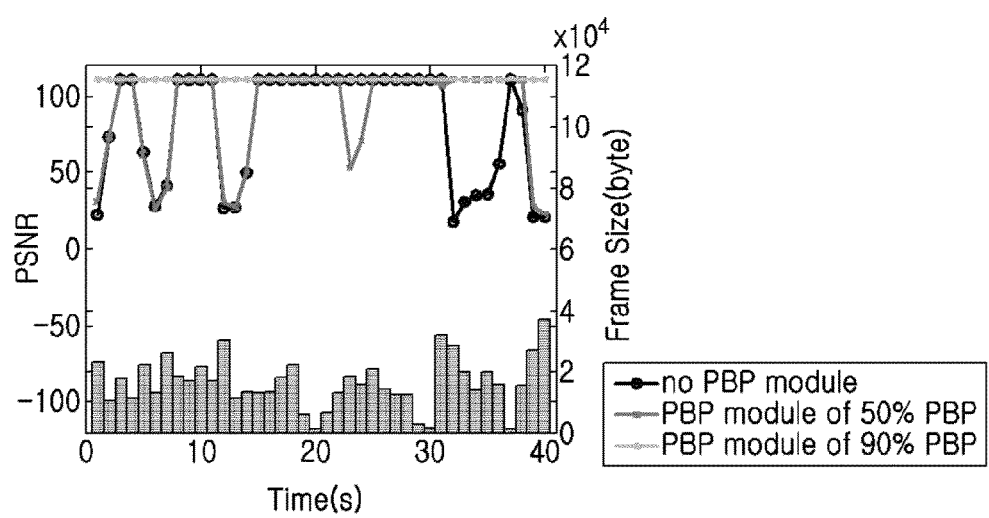
FIG. 12 shows PSNR comparison for the present invention with no PBP module, with PBP module of 50% PBP, and with PBP module of 90% PBP.
Figure 13:
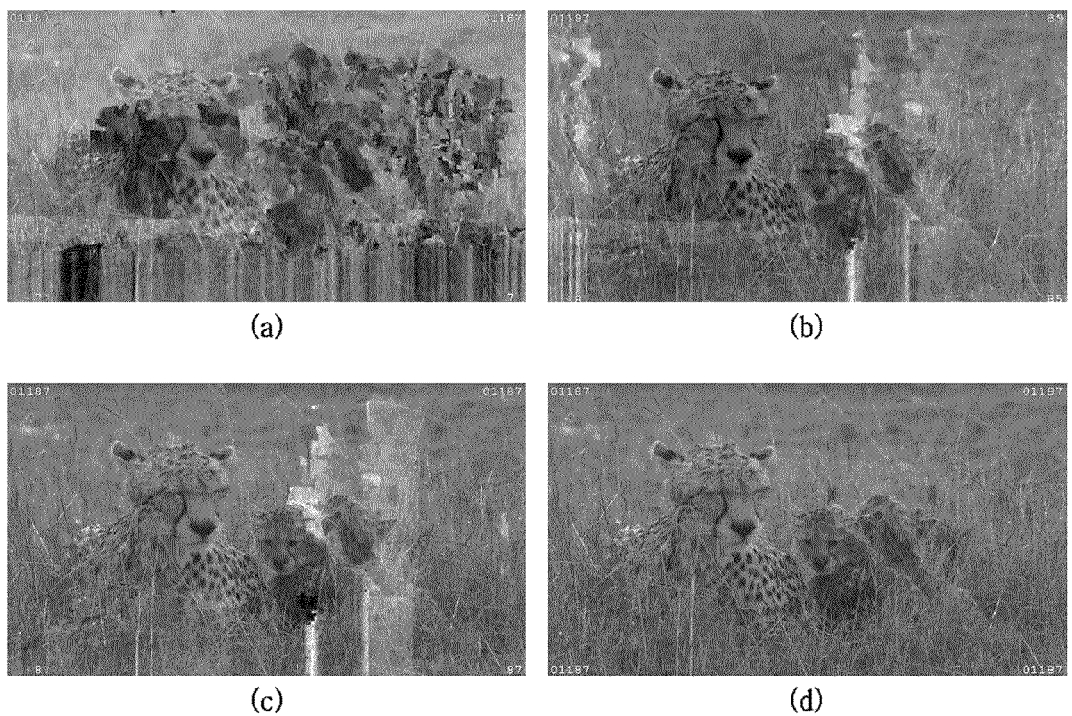
FIG. 13 shows visual comparison for Frame 1187.

The apparatus and method according to second embodiment of the present invention was simulated using network Scenario 2 described above. Input parameter PERCENT was set to two different values in order to progressively show the visual improvement. For the first case, PERCENT is set to 50%, and thus, the apparatus 1100 will send 50% of the packets of frames that are larger than 100 Kbytes via TCP in addition to SPS, PPS, and slice headers. For the second case, PERCENT is set to 90% that allows even more data to be sent via TCP. FIG. 12 shows PSNR comparison between the apparatus which has no the PBP module 316, the apparatus which has the PBP module 316 with 50% PBP, and the apparatus which has the PBP module 316 with 90% PBP. As expected, higher PBP percentage results in better PSNR. The average PSNR for the apparatus without the PBP module 316 is 83.08 dB, while PSNR for PBP with 50% PBP is 90.99 dB. In particular, PSNR for 90% PBP achieves perfect PSNR of 111 dB. This indicates that the apparatus with PBP module 316 is very effective in improving visual quality because it guarantees more data to be received in addition to SPS, PPS, and slice header. FIG. 13 shows visual comparison for Frame 1187. FIG. 13(a) shows Frame 1187 for pure-UDP, FIG. 13(b) shows Frame 1187 for the present invention ho PBP module, FIG. 13(c) shows Frame 1187 for the present invention with PBP module of 50% PBP, and FIG. 13(d) shows Frame 1187 for the present invention with PBP module 90% PBP. Clearly, the present invention has better performance than pure-UDP. In addition, visual quality progressively improves as PBP percentage increases.

Table 3 shows ready times for sub-streams for the apparatus with no PBP module, the apparatus with the PBP module of 50% PBP, and the apparatus with the PBP module of 90% PBP.

TABLE 3

|  | Ready Time (sec.) | | | Playout |
|---|---|---|---|---|
| Sub-stream | no PBP | \w 50% PBP | \w 90% PBP | Deadline (sec.) |
| 2 | 4.80 | 7.35 | 9.83 | 10 |
| 3 | 7.92 | 12.02 | 14.13 | 20 |
| 4 | 11.47 | 16.47 | 17.84 | 30 |

Ready time for each sub-stream increases as the PBP PERCENT parameter increases. However, sub-streams' ready times are still earlier than playout deadlines and therefore no rebuffering is needed.

The apparatus with the PBP module with 90% PBP achieves perfect PSNR and yet there is no rebuffering. In comparison, pure-TCP also achieves perfect PSNR but rebuffers 17 times. Moreover, compare to pure-UDP, the apparatus with the PBP module of 90% PBP achieves 60 dB higher PSNR. The results achieved by the apparatus with the PBP module of 90% PBP are considerably better than pure-TCP and pure-UDP and therefore the present invention clearly has advantages over pure-TCP and pure-UDP methods.

The present invention utilizes NAL units as the basic unit for distinguishing between higher-priority and lower-priority data as mention above. Thus, the present invention is very flexible as it allows prioritization of any H.264 syntax element.

Also, the present invention divides a video stream into sub-streams and transmits them in an overlapped manner. Thus, initial buffering can be minimized and the occurrence and duration of rebuffering can be minimized.

Also, for each sub-stream, high-priority data (i.e., SPS, PPSs, and slice headers) is first sent via TCP to allow the decoder to apply EC and reconstruct frames when low-priority data (i.e., slice data) fails to arrive due to packet loss.

Also, the present invention is more flexible because it is not tied to Data Partitioning and thus, videos do not have to be re-encoded and the network does not have to support Data Partitioning. Moreover, any syntax element from a video stream can be segregated and prioritized. For example, some of the slice data (in addition to SPS, PPS and slice header) can be segregated and prioritized to further improve visual quality.

Finally, our invention utilizes the slack times between sub-streams to send I-slices, and thus the visual quality of I-frames and reduce error propagation can be improved.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalent.

What is claimed is:

1. An apparatus for transmitting an encoded video stream, comprising:
    an encoder configured to encode a video stream using a predetermined compression standard;
    a parser configured to subdivide the encoded video stream into a plurality of sub-streams and parse the sub-streams;
    a MUX configured to segregate a first data which is NAL unit having SPS, PPS, or slice header and a second data which is NAL unit having slice data from the parsed sub-stream, the first data being a high priority data and the second data being a low priority data;
    a first packet generator configured to generate a TCP packet using the first data by the sub-stream and transmit the TCP packet through a TCP tunnel;
    a second packet generator configured to generate a UDP packet using the second data by the sub-stream and transmit the UDP packet through a UDP tunnel; and
    a percentage based prioritization module configured to prioritize a predetermined percent of the second data including the slice data to allow more data to be sent via the TCP tunnel, wherein the prioritized predetermined percent of the second data is packetized as the TCP packet for transmitting through the TCP tunnel.

2. The apparatus of claim 1, wherein the predetermined compression standard is H.264 or H.265, and the encoded video stream does not include Data Partitioning (DP) Profile.

3. The apparatus of claim 1, wherein a TCP session for transmitting the TCP packet and a UDP session for transmitting the UDP packet maintain active status during the transmission of the video stream.

4. The apparatus of claim 1, wherein the first packet generator transmits the TCP packet for n+1-th sub-stream at the same time the second packet generator transmits the UDP packet for n-th sub-stream.

5. The apparatus of claim 4, wherein the first packet generator transmits the TCP packet for n+1-th sub-stream at the same time the second packet generator transmits the UDP packet for n-th sub-stream when a number of the UDP packets stored in a queue is less than a predetermined threshold.

6. The apparatus of claim 1, wherein the prioritized data is I-frame.

7. The apparatus of claim 1, further comprising:
    a first packet receiver configured to receive the TCP packet through the TCP tunnel;
    a second packet receiver configured to receive the UDP packet through the UDP tunnel;
    a DEMUX configured to merge the received UDP packet with the received TCP packet; and
    a decoder configured to decode the merged UDP packet and TCP packet to reconstruct the video stream.

8. The apparatus of claim 7, wherein the DEMUX drops the received UDP packet whose RTP timestamp is greater than a predetermined playout deadline.

9. The apparatus of claim 7, wherein the DEMUX merges the received UDP packet with the TCP packet whose RTP sequence number is smaller than the RTP sequence number of the received UDP packet.

10. A method for transmitting an encoded video stream, comprising:
    encoding a video stream using a predetermined compression standard;
    subdividing the encoded video stream into a plurality of sub-streams;
    segregating a first data which is NAL unit having SPS, PPS, or slice header and a second data which is NAL unit having slice data from the sub-stream, the first data being a high priority data and the second data being a low priority data;
    prioritizing a predetermined percent of the second data including the slice data;
    generating a TCP packet using the first data and a UDP packet using the second data; and
    transmitting the TCP packet through a TCP tunnel and the UDP packet through a UDP tunnel, wherein the prioritized predetermined percent of the second data is packetized as the TCP packet for transmitting through the TCP tunnel to allow more data to be sent via the TCP tunnel.

11. The method of claim 10, wherein the predetermined compression standard is H.264 or H.265, and the encoded video stream does not include Data Partitioning (DP) Profile.

12. The method of claim 10, wherein a TCP session for transmitting the TCP packet and a UDP session for transmitting the UDP packet maintain active status during the transmission of the video stream.

13. The method of claim 10, wherein the TCP packet for n+1-th sub-stream and the UDP packet for n-th sub-stream are transmitted simultaneously.

14. The method of claim 13, wherein the TCP packet for n+1-th sub-stream and the UDP packet for n-th sub-stream are transmitted simultaneously when a number of the UDP packets stored in a queue is less than a predetermined threshold.

15. The method of claim 10, wherein the prioritized data is I-frame.

16. The method of claim 10, further comprising:

receiving the TCP packet through the TCP tunnel and the UDP packet through the UDP tunnel;

merging the received UDP packet with the received TCP packet; and decoding the merged UDP packet and TCP packet to reconstruct the video stream.

17. The method of claim 16, wherein the received UDP packet whose RTP timestamp is greater than a predetermined playout deadline is dropped.

18. The method of claim 16, wherein the received UDP packet is merged with the TCP packet whose RTP sequence number is smaller than the RTP sequence number of the received UDP packet.

* * * * *